Aug. 6, 1963   J. E. BIGELOW   3,100,261
X-RAY ANALYZING APPARATUS WHEREIN TWO COMPARATIVE
DETECTOR CHANNELS HAVE DIFFERENT ABSORPTION
VERSUS FREQUENCY CHARACTERISTICS
Filed July 29, 1960   3 Sheets-Sheet 1
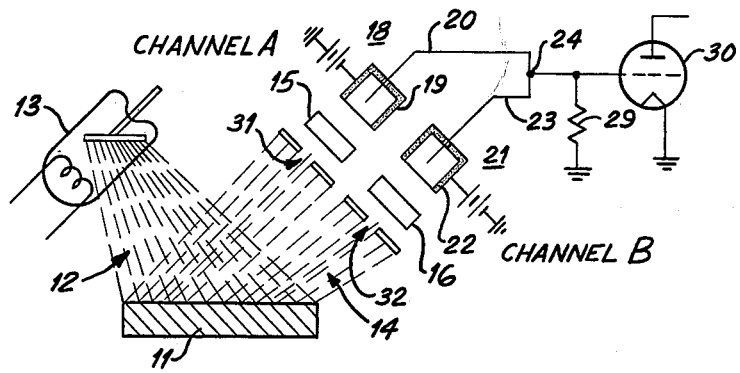
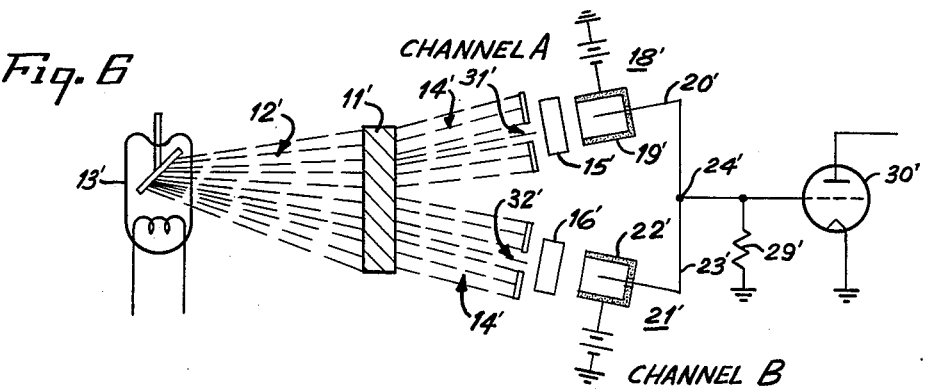
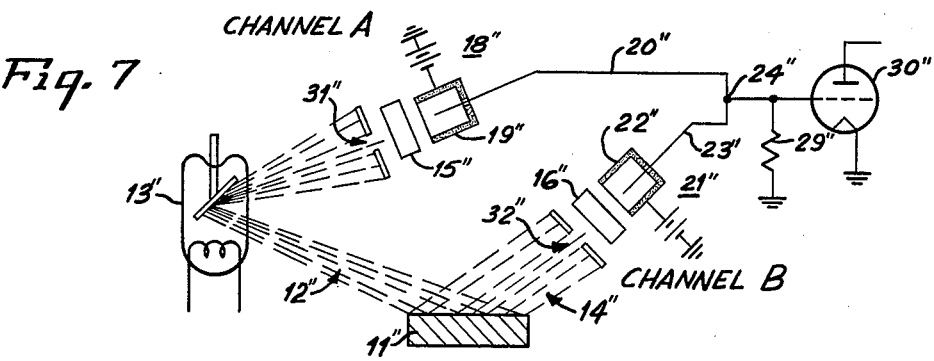
INVENTOR.
JOHN EDWARD BIGELOW
BY
Irving Kayton
ATTORNEY

PERCENT TRANSMISSION THROUGH FILTER

PERCENT ABSORPTION IN ION CHAMBER

TOTAL TRANSMISSION RESPONSE OF CHANNELS

CHANNEL OUTPUT CURRENT

United States Patent Office 3,100,261
Patented Aug. 6, 1963

3,100,261
X-RAY ANALYZING APPARATUS WHEREIN TWO COMPARATIVE DETECTOR CHANNELS HAVE DIFFERENT ABSORPTION VERSUS FREQUENCY CHARACTERISTICS
John Edward Bigelow, Milwaukee, Wis., assignor to General Electric Company, a corporation of New York
Filed July 29, 1960, Ser. No. 46,277
19 Claims. (Cl. 250—51.5)

This invention relates to chemical analysis by means of X-radiation, and more particularly, to method and apparatus for ascertaining the presence or absence of a given element of interest in a specimen or sample and indicating the absolute amount of the element present in the specimen or the relative amount of the element with reference to another material of interest in the specimen. The invention is particularly, but not exclusively, useful in conducting X-ray absorption or emission analyses and the like.

It is well known in the art to utilize X-ray absorption "edge" analysis for the purpose of ascertaining the presence or absence, and if present, the amount of a given element in a specimen under examination. Basic to X-ray absorption edge analysis is the fact that absorbers for X-rays become increasingly transparent to the radiation as the wavelength is lowered until, at a certain critical frequency characteristic for each specific element, the sample suddenly becomes very opaque. This phenomenon exhibits itself as a discontinuity in a plot of wavelength versus absorption coefficient for each element, these discontinuities being referred to as "edges." The discontinuous change in absorption is explained by the quantized structure of the atom, orbital electrons being bound to the nucleus by discrete energies, the magnitudes of which depend upon which level the particular electron occupies, i.e., K, L, M, N, etc., and upon the energy state of the electron in its orbit. Individual elements display different binding energies for specific level electrons and, therefore, require different quantities of energy to eject electrons from the specific level with accompanying ionization. Wavelengths of X-radiation are correlated to the energy of the X-rays in that the shorter the wavelength, the greater the energy therein. As a consequence, continuous application of heterogeneous or polychromatic X-radiation will include an energy level, i.e., a discrete frequency, whereat specific level ionization occurs, accompanied by a very large increase in absorption which results in the discontinuity known as the "edge" for that level, for example the "K edge."

The absorption edge phenomenon makes possible an X-ray analyzer which is specific to a given element. Thus, if analysis of a particular material is desired, it is possible to irradiate a given sample or specimen and the reflected or transmitted radiation therefrom may be divided into two separate beams which are then filtered with filters having respectively different but closely spaced characteristic absorption edges. The original polychromatic energy irradiates the specimen which emits characteristic radiation wavelengths. The characteristic wavelength for the element of interest is at a level or frequency falling between the two absorption edges of the two filters, known as the pass band. As a consequence, the outputs of the two filters are different solely for that frequency between their absorption edges characteristic of the element of interest. For all other frequencies, the absorption characteristics of the filters are substantially the same. Therefore the outputs of two detectors located behind the filters are equal and may be balanced against each other to provide a null signal only in the absence of the element of interest. For a more detailed discussion of absorption edge analysis, reference may be had to "X-Ray Absorption and Emission in Analytical Chemistry" by Liebhafsky et al., John Wiley and Sons, Inc., 1960.

The absorption edge analyzing equipment discussed generally above is capable inherently of indicating solely the amount or absence of one specified element. It is the case, however, that in many practical applications, the mere presence of a single given element and its quantity is less than sufficient information than can profitably be used. For example, in quality control situations wherein it is desired to ascertain the amount of a given element, not in isolation, but relative to the amount of another element in the specimen, it is necessary to provide some means for the comparison required. Thus, it may be the case that an alloy or other mixed material comprising, for example, two elements, is being produced and quality control samples or readings are taken to ascertain whether or not the proportion of one element to the other is correct. In a situation such as this, the mere fact that a given amount of a first element is present in the specified amount is not an indication of whether the production facilities are operating satisfactory. The property which is determinative of a satisfactory process is that the proportion of one element to the other is correct and does not vary. Thus, in such a case an increase in one element is quite satisfactory if there is a concomitant increase in the other element.

If it were desired to provide such a proportional indication with absorption edge analysis, then two complete sets of such equipment would be required. One set of equipment would have to be designed to provide an indication of the absolute amount of one element, and another complete set of equipment would have to be designed for the second element.

It is an object of this invention, therefore, to provide simple and inexpensive X-ray analyzing equipment providing an indication of the amount of a given element or material in a sample or specimen relative to the amount of another element or material in that specimen, such that the indication is a measure of the proportion of one to the other.

It is an additional object of this invention to provide such a proportional indication with less and more simple equipment than is possible by absorption edge analysis.

The above objects are accomplished in accordance with the principles of invention by having a source of X-radiation impinge upon a sample or specimen to be examined which, in turn, emits characteristic radiation; the emitted radiation then enters two separate channels, the output of one of which has an amplitude versus frequency characteristic including a maximum corresponding to a given frequency of interest, and the other channel has a similar characteristic with a maximum displaced (in frequency) from that of the first channel. Each channel comprises an aperture, filter and ion chamber detector. The parameters of the filters, apertures and detectors of the two channels are chosen relative to the known content of the specimen such that the output of the two channels when balanced against each other provides a null reading when the specimen contains the two elements of interest in the required or desired proportion. The outputs of the two channels are of opposing polarity such that the polarity of the balanced signal if other than a null reading indicates which of the two elements is in excess.

It is one of the major advantages of the invention that the operation of the embodiments in accordance with the invention are in no way dependent upon the existence of an absorption edge at any particular frequency. It is the case that the location of the maxima of the two channels in terms of the amplitude versus frequency response characteristics thereof have no necessary or required relationship to the absorption edges of the filters used in the two channels. It is an additional advantage that applying energy from one X-ray tube source to two separate channels and balancing the output therefrom results in an automatic compensation in the ouput readings for fluctuation or variation in the X-ray source.

In accordance with one of the embodiments of the invention, the X-radiation from the source enters the two separate channels not both from the specimen to be examined; one channel receives radiation from the specimen and the other channel receives it directly from the X-ray source. In an arrangement of this type the output signal from the two channels constitutes an indication of the absolute rather than relative quantity of the specific element under investigation.

The novel features which I believe to be characteristic of my invention are set forth with particularly in the appended claims. My invention, itself, however, both as to its organization and operation, together with further objects and advantages thereof, may best be understood by reference to the following description taken in connection with the accompanying drawings.

In the drawings:

FIG. 1 is an illustrative embodiment, given by way of example, of an X-ray emission analysis system in accordance with the principles of the invention;

FIG. 6 and 7 are modifications of the embodiment of FIG. 1.

Figure 2A:
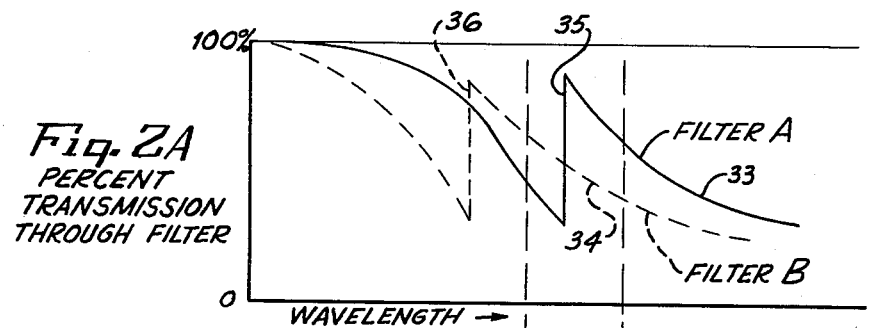
FIGS. 2A, 3A, 4A and 5A are graphic illustrative curves representative of certain characteristics of components of the embodiment of FIG. 1.

Referring now to FIGURE 1 in greater detail, there is shown a first illustrative embodiment of the invention, wherein X-ray emission or fluorescent phenomena are employed. There is provided a sample or specimen 11 which may be, for example, an alloy or mixture consisting of two elements or constituents, one of which is to be determined both qualitatively and quantitatively. A polychromatic X-ray beam number 12, i.e., a beam including a wide spectrum of frequencies and therefore of electron energy levels, emanates from a standard X-ray tube 13 and is directed onto the specimen 11. Since the beam contains radiation of sufficiently short wavelengths, and therefore sufficiently high energy levels, the threshhold or exciting frequency of the two elements present in the specimen is reached, and the specimen emits rays 14 of corresponding characteristics or fluorescent radiation. The characteristic radiation 14 is transmitted through a pair of adjacent filters 15 and 16 that will be described more fully hereinafter. At this point, suffice it to say that the two filters consist of materials, respectively, of different atomic numbers and have different absorption edges, i.e., the absorption edges are at different energy levels or frequencies.

There is provided a pair of detectors in the form of ion chambers 18 and 21 respectively, intercepting radiation transmitted through filters 15 and 16. Electrodes 20 and 23 of the ion chambers are connected together at a junction point 24 and their respective shells 19, and 22 have applied to them voltages of opposite polarities from the batteries illustrated, or from any other D.C. source.

The two ion chambers are filled with different gases. The gas which fills ion chamber 18 exhibits the property of absorbing substantially all X-radiation of a wavelength greater, by a given increment than the wavelengths corresponding to the absorption edge of filter 15. In a similar manner, the ion chamber 21 includes gas characterized by the property of absorbing substantially all wavelengths greater, by a given increment, than the wavelengths corresponding to the absorption edge of filter 16. The details of the composition and construction of filters 15 and 16 and ion chambers 18 and 21 will be discussed in greater detail below, and most especially in relationship to their functions in accordance with the principles of the invention.

Effectively, then, the difference signal produced at junction point 24 is the resultant difference signal dependent upon the intensity difference between radiation passing through filter 15 and ion chamber 18 on the one hand, and filter 16 and ion chamber 21 on the other hand. This difference signal passes through a resistor 29 in order to develop a voltage which is impressed on the grid of an electrometer tube 30, for example. The electrometer tube circuit and means for further amplifying and utilizing the signal have been omitted because they are well known in the art.

From the description of the embodiment of FIGURE 1, it may be seen that two separate transmission channels are characteristic of the embodiment. Thus, radiation emanating from the specimen 11 passes through a first channel, hereinafter referred to a channel A, which comprises the filter 15 and ion chamber 18. On the other hand, the radiation from the specimen which passes through a filter 16 and ion chamber 21 is passed through what hereinafter is referred to as channel B. For ease in exposition, the filter 15 and the ion chamber 18 (comprising channel A) will be called filter A, and ion chamber or detector A, respectively, while the filter 16 and the ion chamber 21 (comprising channel B) will hereinafter be referred to as filter B, and ion chamber or detector B, respectively. Intermediate the specimen 11 and each of filters 15 and 16, there is disposed an aperture 31 and 32 designed to control the magnitude of radiation reaching each of the filters A and B. In this manner, the total radiation propagating through channel A and channel B is dependent not only upon the filters and ion chambers, but also upon the size of the aperture 31 of channel A or 32 of channel B, hereinafter referred to as apertures A and B. In order to comprehend the unified operation, and principles of operation, of FIGURE 1, reference may be had to the curves presented in FIGURES 2A through 5A.

FIGURE 2A graphically represents the characteristics of filters 15 and 16. The ordinate represents the percentage of radiation transmitted through the filter, while the abscissa represents the wavelength, of the X-radiation. As is known in the art, the energy of the radiation is inversely proportional to wavelength and directly proportional to frequency. Thus, the abscissa increases to the right with wavelength and decreases to the right with energy level of the radiation. Curve 33 corresponds to the transmission response of filter A while curve 34 corresponds to the transmission response of filter B. The two filters are of different materials, e.g., filter A may be copper, while filter B may, for example, be silver or molybdenum. In any event, they are of two elements having substantially different atomic numbers to provide the required spacing of a given amount between their respective absorption edges indicated by that portion of curve 33 numbered 35 and that portion of curve 34 numbered 36. It is the case that varying the thicknesses of filters A and B results in translation of curves 34 up or down with a thickening of the filter resulting in a downward shift since there is less transmission therethrough. However, the general shape of the curve and the location of the absorption edge along the abscissa remains constant, since this is a function of the element and not the amount or density of the element in the path of the X-radiation. In this manner, the propagation characteristics of the filters A and B are defined by the curves of FIGURE 2A.

Figure 3A:
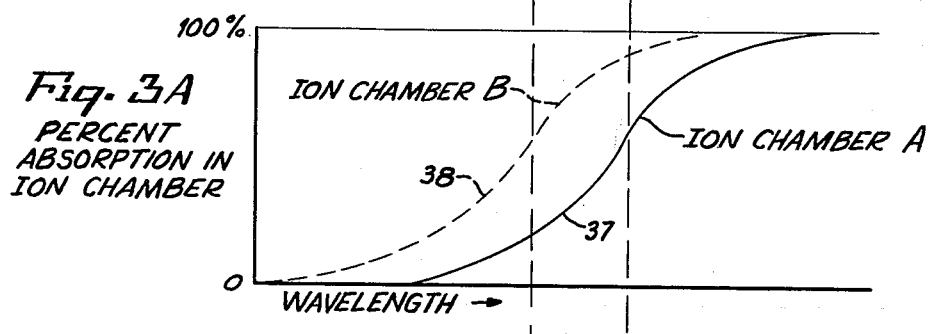

FIGURE 3A represents the absorption characteristics of the detectors A and B, wherein the ordinate represents percentage of absorption of the radiation while the abscissa represents wavelength of the radiation in the same manner as the abscissa of FIGURE 2. As a consequence, the curves 37 and 38 represent the absorption characteristics of the ion chambers A and B, which, it may be recalled, are each filled with different gases. Typically useful gases for this purpose may be argon or xenon. Although the gases in detectors A and B may be of different chemical elements, the same gas may be used in both chambers and still provide results in accordance with the principles of the invention if the pressure of the gas in one chamber is greater than that in the other, or if the path that the gas offers to the propagating radiation is longer in one chamber than the other. All of these factors, and each of these factors, will provide the spacing between the two curves A and B disclosed in FIGURE 3A. It is of significance that substantially complete absorption of the X-radiation is provided by detector A at some frequency which is an approximate incremental distance from the frequency at which the ion chamber B substantially completely absorbs the X-radiation. Thus, looking at FIGURE 3A, it may be noted that there is a given distance between the intercept of curve 37, corresponding to detector A, and the 100% line on the one hand, and the intercept of curve 38, corresponding to detector B, and the 100% absorption line on the other. This distance is controlled, i.e., this frequency increment is controlled, by any or all of the aforementioned parameters so that it is substantially equal to the frequency interval between the absorption edges of the filters A and B of FIGURE 2A.

It follows, therefore, that the initial point of substantially complete absorption for detector A occurs at a frequency interval below the absorption edge of filter A (referring to wavelengths, the interval is to the right, or above the absorption edge of filter A). At the same time, the initial point of substantially complete absorption of detector B is spaced the same distance from the absorption edge of filter B as the aforementioned interval for detector A and filter A.

Figure 4A:
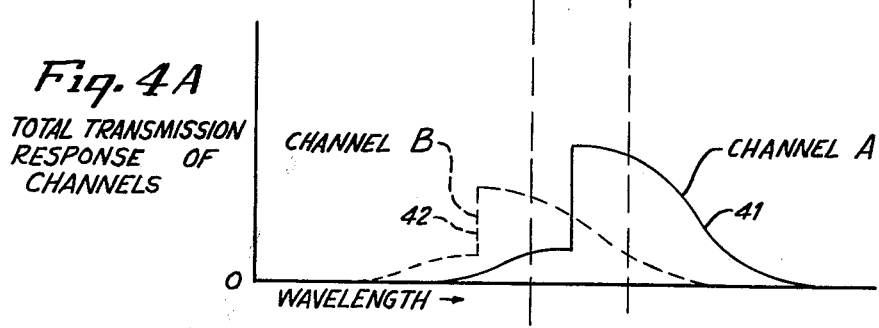

Referring now to FIGURE 4A there is presented the total transmission response of the entire channel A and the entire channel B, i.e., the response as a result of propagation through filter A and detector A is represented by the curve 41 (the product of curves 33 and 37), while the total transmission response through filter B and detector B is represented by the curve 42 (the product of curves 34 and 38). In short, curve 41 represents the channel A transmission characteristic, while curve 42 represents the channel B transmission characteristic, ignoring for the moment the effect of apertures A and B in the system. The ordinate of FIGURE 4A, therefore, represents the total transmission through the channel, while the abscissa, as in FIGURES 2A and 3A, represent the wavelength of X-radiation. It may be noted that the channel A and channel B transmission characteristics each have a single maximum.

If radiation characteristic of certain elements (other than the two of interest) passes through the channel having a wavelength between the left hand edge of curve 42 and the right hand edge of curve 41, there would be a response output from the detector circuit. However, what we now are considering is the operation of a device upon specimen 11, which it was previously stated is of the type comprising solely two elements or constituents, both of which are known. Indeed, the filters and the parameters of the gases in the ion chambers are selected expressly with the two elements of the specimen in mind.

Figure 5A:
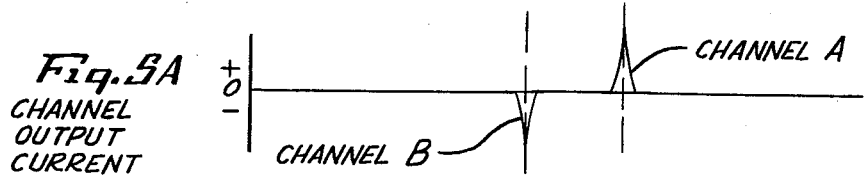

The operation of the embodiment of FIGURE 1 and its sequential responses, as shown in FIGURES 2A through 4A, now may properly be comprehended by viewing the end result in FIGURE 5A.

In FIGURE 5A there are disclosed curves wherein the ordinate is the magnitude of output current from the ion channels A and B while the abscissa is the wavelength of the X-radiation exciting the output current. Assuming that the element to be tested is iron that provides through channel A, iron K alpha radiation (wavelength of approximately 1.8 Angstrom unit) such that it is slightly to the right of the absorption edge of the copper filter (the copper K alpha radiation being at 1.54 Angstrom units) it may be seen that the presence of iron in the specimen 11 results in an output from channel A close to the maximum in FIGURE 4A for curve 41 and resulting as a consequence, in an output signal 44 which is represented in FIGURE 5A as a pulse. This is merely to represent a magnitude for the signal that is produced by iron in the specimen, recognizing that the more iron there is in the specimen, the greater will be the amplitude of the curve.

Concomitantly, through channel B is provided a signal corresponding to the presence of the other element of the two elements in the alloy or mixture. Since channel B has its ion chamber biased oppositely to that of channel A, it may be seen that the output signal from channel B is of opposite polarity to that of channel A. As a consequence, at junction point 24 of FIGURE 1, the two signals add algebraically to provide a subtraction of the two.

With a predetermined desired amount of iron in the specimen 11, the apertures 31 and 32 for channels A and B may be proportioned such that the aperture 31 for channel A is smaller than that for channel B, and, as a consequence, the signal out through channel A is equal in magnitude to that out through channel B. In this way, a null indication appears at junction 24 and tube 30 as a result of the existence of the iron in the specimen of an amount equal to the reference level, or equal to the predeterminedly desired amount of iron in the specimen.

If more or less iron than the reference amount of iron appears in the specimen, and the amount of the second element remains constant, then the output signal at junction 24 will be greater, or less than zero, respectively. The magnitude of the positive or negative signal is proportional to the excess or deficiency, respectively, of the iron with respect to the reference amount. Thus, in a quality control situation wherein iron in any form is continuously being added to form a mixture or alloy, the reading on electrometer 30 of FIGURE 1 provides a continuous monitor of the process. A continuous null reading indicates all is well. Positive or negative readings indicate more or less iron than the desired amount is being added and the tolerance level or danger point for such amounts may be marked directly on the meter. Furthermore, even if the danger point is not exceeded, periodic or aperiodic movement of the meter reading from the null may provide valuable information about characteristics of the process or equipment used in adding the iron.

If more or less iron than the reference amount is added, but the other element in the mixture also varies in the same direction and proportionately then the correct proportion is maintained and a null reading is still obtained. Reference to FIGURE 5A makes it clear that if the output signal of channel A changes in magnitude in a given sense, and the output of channel B changes the same amount and in the same sense as that of channel A, then the combined change is zero and a null signal is maintained. The parameters of the apertures, filters and detectors may be proportioned such that this balancing of signals for proportionately correct changes in the outputs of both channels is maintained correct for large changes in signals from both channels.

If one or both of the elements change disproportionately then the polarity of the output signal directly indicates which of the two elements is in excess.

It is one of the advantages of the instant invention that certain critical requirements of typical absorption edge equipment and methods are not necessary conditions for apparatus operating in accordance with the invention. The stringent requirement of critically locating absorption edges of two filters relative to each other is an unnecessary condition in accordance with the instant invention.

The curves of FIGURES 2B through 4B demonstrate the application of the principles of the invention to situations wherein the X-radiation frequencies and energy levels of interest are considerably removed from, and bear no significant relation to, the absorption edge of a filter in one of the channels. FIGURES 2B through 4B correspond to their counterparts 2A through 4A and all of the reference numerals of the series 2A through 4B are primed to indicate comparable curves to those of the series 2A through 4A. The curves of FIGURES 2B–4B are for specific filters and ion chambers for a practical application of the invention. They are particularly appropriate for an analysis of copper in a copper bearing ore. In such an arrangement channel A' responds to copper K alpha radiation and a wavelength range somewhat below it by the combination of a nickel filter A' and an ion chamber filled with argon. Channel B' has a response centered at approximately twice the excitation energy for copper by use of an aluminum filter and ion chamber filled with xenon. The details of the parameters of these components and their response characteristics will now be presented in greater detail.

Figure 2B:
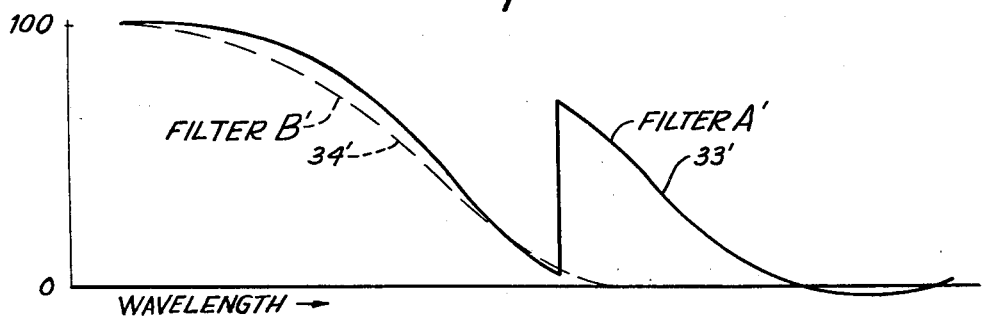
FIGS. 2B, 3B and 4B are counterparts of FIGS. 2A, 3A and 4A, for similar components having different valued parameters or characteristics.

In FIGURE 2B filter A' for channel A' is a .001 centimeter thick nickel filter. The absorption edge of curve 33' is clearly defined and this may be considered a characteristic comparable to the curve 33 representing the characteristics of filter A in FIGURE 2A. In FIGURE 2B the filter B', however, is a .03 centimeter thick aluminum filter. It may be noted that the absorption edge for the filter does not appear since it is at an unused portion of the curve located beyond the representation of the abscissa of FIGURE 2B.

Figure 3B:
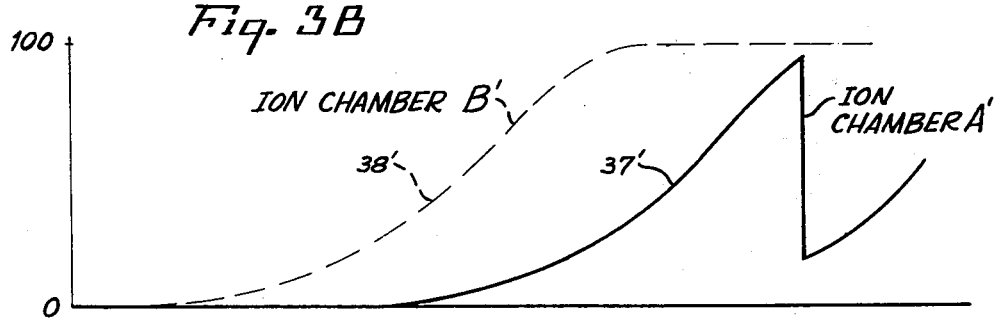

FIGURE 3B represents the characteristics of the ion chambers for channels A' and B' that may be utilized with the filters of FIGURE 2B. Thus the channel A' detector may be an ion chamber having an argon gas at a pressure of 38 millimeters of mercury representing an absorption path of 2.0 centimeters while the ion chamber of channel B' may be filled with xenon also at a pressure of 38 millimeters of mercury and having an absorption path of 2.0 centimeters.

Figure 4B:
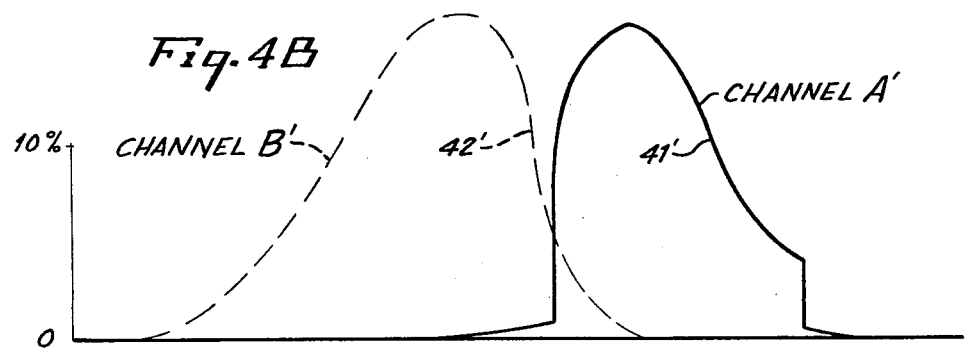

FIGURE 4B represents the product of the effects of the filters and detectors in FIGURES 2B and 3B, i.e., the response characteristics for the two channels. Comparison of FIGURE 4B with FIGURE 4A shows that the total response characteristic provides distinct maxima at different frequencies which may be in accordance with the invention. The response characteristic for channel B' is just as effective for the purposes of the invention when that portion of the transmission characteristic of the aluminum filter is used which is remote from the absorption edge as was the case with the filter B of FIGURE 2A wherein the portion of the transmission characteristic that was used was quite close to the absorption edge. As a consequence, considerable flexibility and versatility is available in accordance with the principles of the invention in that the invention is not restricted to specific portions of response characteristics of different materials. In this way, the embodiment of FIGURE 1 utilizing the filters, ion chambers and parmeters described with respect to FIGURES 2B through 4B provides the appropriate output signals discussed above. Varying the size of the apertures in the two channels provides the same effect as that discussed above and the signal outputs from channels A' and B' may be balanced to provide a null indication for any given desired proportion of one element to another material.

Referring now to FIGURE 6, there is disclosed an embodiment structurally similar to that of FIGURE 1 with the exception that the specimen or sample is of the type such that the X-radiation from the X-ray source may be transmitted through the specimen or sample, and the analysis is based upon absorption rather than fluorescence. A typical example wherein such an arrangement is profitably used is the instance wherein the amount or concentration of a given compound in solution is the subject of investigation. The arrangement of FIGURE 6 may utilize the filters, ion chambers and parameters specified with respect to FIGURES 2B through 4B when, for example, it is desired to measure the amount of a nickel compound in some solution.

In the embodiments of the invention described thus far, the output information obtained is of a relative type, i.e., the proportion of one element or material to another element or material. It is sometimes desirable, however, to ascertain the absolute quantity of a single element or material independently of the proportion of that material to any other element or material. The embodiment of FIGURE 7 is an arrangement wherein such an indication is possible.

Referring to FIGURE 7 more specifically then, there is a disclosed system which is similar in all aspects to those of FIGURES 1 and 6 with the exception that the sample or specimen analysed is arranged relative to the filters, apertures and detectors of channels A and B in a special manner. In particular the specimen is arranged such that X-radiation emanating from the X-ray tube proceeds, in part, directly into channel A without first impinging upon the sample or specimen. A portion of the X-radiation from the X-ray tube, however, is directed to the sample or specimen from whence is emitted the characteristic radiation of the element or material of the specimen. This emitted characteristic radiation proceeds then into channel B. The processing of the radiation through both channels A and B is the same as discussed above in describing the operations of these two channels with respect to FIGURES 1 and 6. The parameters of channels A and B may be proportioned such that the direct beam into channel A produces an output therefrom that balances the output from channel B when the element in question exists in the specimen or example under observation in a given amount.

In this arrangement, the only possible variation in the output from channel A, in view of the fact that X-radiation goes directly into it from the tube, is a result of variation in the output signal of the X-ray tube resulting from an undesired variation in the accelerating voltage applied to the tube. In accordance with this and the other embodiments in accordance with the invention, any variation in the accelerating voltage is effectively nullified by virtue of the fact that the variation is experienced in both channels A and B since the same initial X-ray beam is applied to both channels. In all of these embodiments the balancing of the output current from the two channels results in the null point becoming relatively insensitive to fluctuations in the X-ray tube output. Furthermore, this relative independence of the effects of X-ray source fluctuation may be controlled and, as circumstances require, improved by adjustment of the parameters, of the apertures, filters and ion chambers.

While I have shown particular embodiments of my invention, it will be understood that many modifications may be made without departing from the spirit thereof, and I contemplate by the appended claims to cover any such modifications as fall within the true spirit and scope of my invention.

What I claim is:

1. X-ray analyzing apparatus comprising: a source of polychromatic X-radiation; a sample to be analyzed disposed in the path of said polychromatic X-radiation; first and second X-radiation transmission channels each disposed to receive characteristic fluorescent radiation from said sample; said first and second channels each including an X-ray filter and an ion chamber disposed in sequence; said filters having different transmission vs. frequency characteristics from each other; said ion chambers having different absorption vs. frequency characteristics from each other; and means for combining the outputs of said ion chambers.

2. X-ray apparatus as recited in claim 1 wherein said filters comprise a different element from each other.

3. X-ray apparatus as recited in claim 1 wherein the weight per unit area of each of said filters is different from that of the other.

4. X-ray apparatus as recited in claim 1 wherein said ion chambers contain different gases from each other.

5. X-ray apparatus as recited in claim 1 wherein each of said ion chambers contains a gas with the gas in one chamber under a different pressure from that of the other.

6. X-ray apparatus as recited in claim 1 wherein each of said ion chambers is D.C. biased with polarity opposite to that of the other ion chamber.

7. X-ray apparatus as recited in claim 1 wherein each of said first and second channels includes an aperture for additionally controlling the intensity of X-radiation passing therethrough, said apertures having different dimensions from each other.

8. X-ray analyzing apparatus comprising: a source of polychromatic radiation; a sample to be analyzed and disposed in the path of said polychromatic X-radiation; first and second X-radiation transmission channels each disposed to receive X-radiation and at least one of which is disposed to receive characteristic fluorescent radiation from said sample; said first and second channels each including an X-ray filter and an ion chamber disposed in sequence; said filters having different transmission vs. frequency characteristics from each other; said ion chambers having different absorption vs. frequency characteristics from each other; and means for combining the outputs of said ion chambers.

9. X-ray apparatus as recited in claim 8 wherein solely one of said channels is disposed so as to receive said characteristic fluorescent radiation from said sample.

10. X-ray apparatus as recited in claim 9 wherein the weight per unit area of each of said filters is different from that of the other.

11. X-ray apparatus as recited in claim 9 wherein said filters comprise a different element from each other.

12. X-ray apparatus as recited in claim 9 wherein said ion chambers contain different gases from each other.

13. X-ray apparatus as recited in claim 9 wherein each of said ion chambers contains a gas with the gas in one chamber under a different pressure than that of the other.

14. X-ray apparatus as recited in claim 9 wherein each of said ion chambers is D.C. biased with polarity opposite to that of the other ion chamber.

15. X-ray analyzing apparatus comprising: a source of polychromatic X-radiation; a sample to be analyzed disposed in the path of said polychromatic X-radiation; first and second X-radiation transmission channels each disposed to receive radiation transmitted through said sample; said first and second channels each including an X-ray filter and an ion chamber disposed in sequence; said filters having different transmission vs. frequency characteristics from each other; said ion chambers having different absorption vs. frequency characteristics from each other; and means for combining the outputs of said ion chambers.

16. X-ray apparatus as recited in claim 15 wherein said ion chambers contain different gases from each other.

17. X-ray apparatus as recited in claim 15 wherein each of said ion chambers contains a gas with the gas in one chamber under a different pressure from that of the other.

18. X-ray analyzing apparatus comprising: X-radiation producing means for producing polychromatic X-radiation; material to be analyzed by said X-ray analyzing apparatus disposed in the path of said X-radiation from said means and through which said radiation is transmitted; first and second X-ray filters disposed in the path of said radiation after being transmitted through said sample, said filters having different transmission versus frequency characteristics from each other; first and second channels each including a detecting means coupled to the outputs of said first and second filters respectively, said first and second channels having different transmission versus frequency characteristics from each other; and means for combining the outputs of said first and second detecting means.

19. X-ray analyzing apparatus comprising: a source of polychromatic X-radiation; material to be analyzed by said X-ray analyzing apparatus disposed in the path of said polychromatic X-radiation; first and second X-radiation transmission channels each disposed to receive characteristic fluorescent radiation from said material; said first and second channels each including an X-ray filter and an X-ray detector in sequence; said filters having different transmission versus frequency characteristics from each other; said detectors having different output signal versus input frequency characteristics from each other; said first channel having an output signal versus input frequency characteristic determined by said characteristics of said filter and detector within said first channel characterized by a maximum at a particular frequency; and said second channel having an output signal versus input frequency characteristic determined by said characteristics of said filter and detector within said second channel having a maximum at a frequency different from said particular frequency maximum of said first channel.

References Cited in the file of this patent

UNITED STATES PATENTS

| 2,763,790 | Ohmart | Sept. 18, 1956 |
| 2,897,367 | Andermann | July 28, 1959 |
| 2,897,371 | Hasler | July 28, 1959 |

OTHER REFERENCES

Elements of X-Ray Diffraction by Cullity Addison-Wesley Publishing Co., Inc., Reading, Mass., 1956, pages 211–213.